United States Patent [19]
Sekido

[11] Patent Number: 5,116,101
[45] Date of Patent: May 26, 1992

[54] SEAT DISCOMFORT PREVENTIVE DEVICE

[75] Inventor: Tatsuya Sekido, Gifu, Japan

[73] Assignee: Kabushiki Kaisha Toyota Chuo Kenkyusho, Aichi, Japan

[21] Appl. No.: 587,794

[22] Filed: Sep. 25, 1990

[30] Foreign Application Priority Data

Sep. 27, 1989 [JP] Japan .................. 1-251591

[51] Int. Cl.⁵ ............................................ B60N 2/00
[52] U.S. Cl. ........................... 297/330; 297/69; 297/337
[58] Field of Search ............ 297/330, 69, 83, 88, 297/316, 325, 337, 340, 342, DIG. 7, 361

[56] References Cited

U.S. PATENT DOCUMENTS

| | | | |
|---|---|---|---|
| 2,770,233 | 11/1956 | Thomas | 297/330 X |
| 3,934,927 | 1/1976 | Zur | 297/69 |
| 4,574,901 | 3/1986 | Joyner | 297/337 X |
| 4,832,403 | 5/1989 | Tomita | 297/330 |
| 4,860,733 | 8/1989 | Parker, Jr. | 297/330 X |

FOREIGN PATENT DOCUMENTS 3419008 12/1985 Fed. Rep. of Germany ...... 297/330

Primary Examiner—Laurie K. Cranmer
Attorney, Agent, or Firm—Fleit, Jacobson, Cohn, Price, Holman & Stern

[57] ABSTRACT

A seat discomfort preventive device includes: a seat back capable of inclining in the fore-and-aft direction; a seat cushion capable of inclining in the fore-and-aft direction; a rocking control unit; and a drive mechanism for rocking at least one of the seat back and the seat cushion. The rocking control unit delivers a control signal in response to a start signal. In accordance with this control signal, the drive mechanism repeatedly rocks at least one of the seat back and the seat cushion with respect to a standard position depending on a sense of discomfort. The rocking control unit may include an inclining control unit. Additionally, a foot plate on which the feet of a passenger are rested is attached to the seat cushion.

6 Claims, 5 Drawing Sheets

STANDARD POSITION

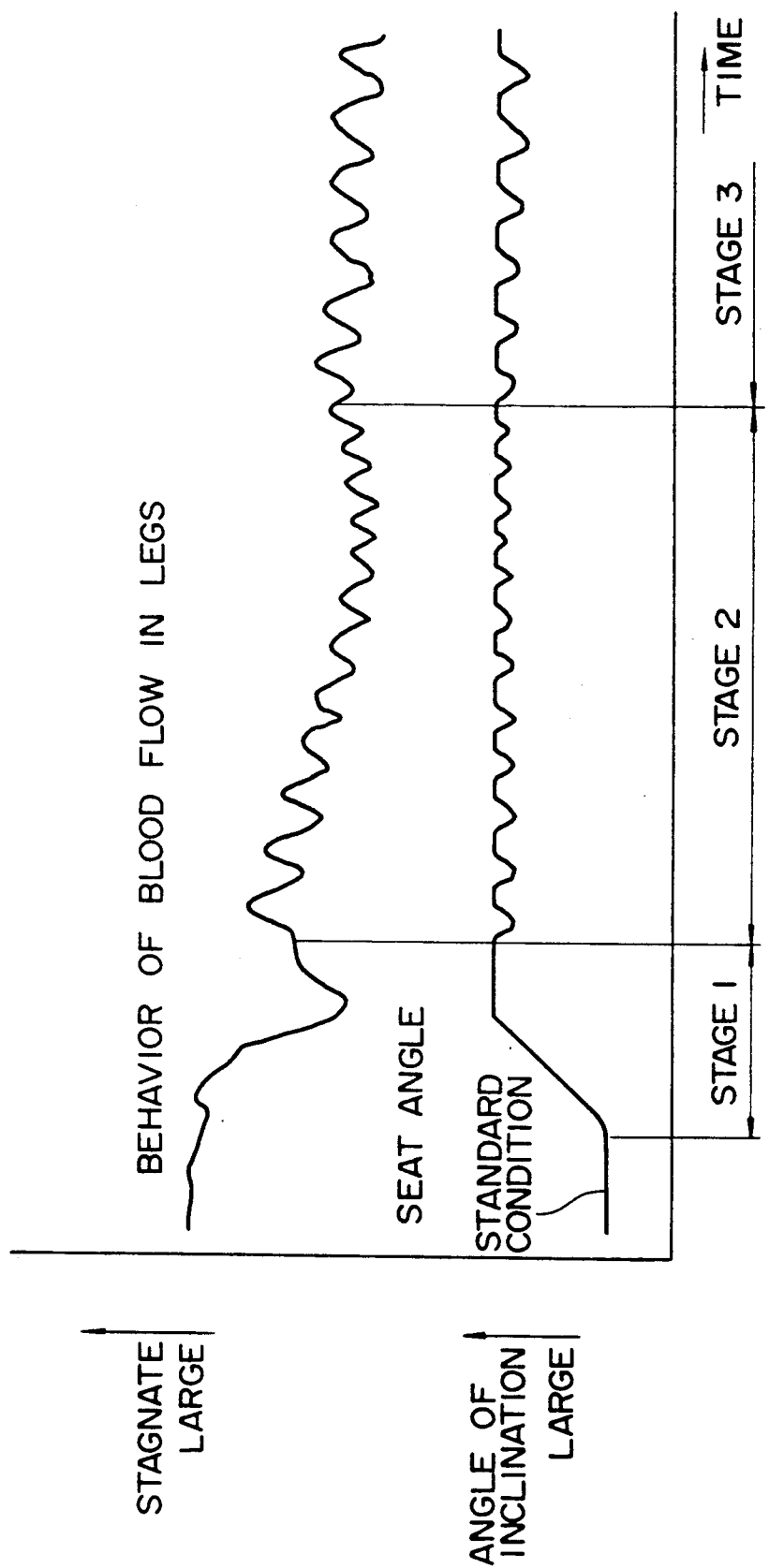

SEAT DISCOMFORT PREVENTIVE DEVICE

BACKGROUND OF THE INVENTION

1. Field of the Invention

This invention relates to a seat discomfort preventive device adapted for use in transport vehicles.

2. Description of the Related Art

Conventionally, in the seats of transport vehicles, the angle of inclination of a seat back for supporting the upper part of a passenger or a driver, a seat cushion for supporting the buttocks and thighs, a leg support for supporting the shanks under the condition that the limbs are stretched, etc. is adequately set so as to make a passenger most comfortable. (See, for example, "Collection of commonly known/used techniques", Car Seat, page 195, published by the Japanese Patent Office on Feb. 26, 1988.)

A proper angle of inclination of the seat back will give the sense of comfort to the upper part of the passenger, and a proper angle of inclination of the seat cushion and of the leg support will give the sense of comfort to buttocks and to thighs and shanks, respectively.

However, even if the seat is changed in position to cause a change in the seating posture of the passenger, the sensibility of the passenger and the sensitivity of each physical sense organ adapt quickly to such a change of seating posture and the passenger again undergoes the sense of discomfort.

Furthermore, if the upper part and the head are held virtually horizontal, the vigilance of the sympathetic part of the autonomic nervous system in the body lowers; consequently, the return of blood (controlled by the sympathetic nervous system) from the venous blood vessel of the four limbs (inclusive of the shanks) to the heart tends to stagnate. That is, the adjustment of the seat in terms of the angle of inclination brings about little effects in giving the sense of comfort to the limbs (particularly to the shanks), or rather, aggravates the sense of discomfort of the shanks because the excitation level of the sympathetic nervous system is decreased.

Therefore, even if any conventional reclining mechanism is incorporated for the purpose of improving the sense of seat discomfort, the sense of discomfort is rather aggravated.

SUMMARY OF THE INVENTION

It is an object of the present invention to provide a seat discomfort preventive device for preventing the occurrence of the sense of seat discomfort in four limbs, especially in shanks.

The present invention has been accomplished on the basis of the following points:

A passenger in a running vehicle generally keeps one's posture stationary for a long time. Consequently, the physiological function is remarkably degraded temporarily, thus decreasing the cardiac output of blood to deteriorate the return of blood in the four limbs. In addition, the excitation level of the sympathetic nervous system closely relating to the return of blood adapts to external stimulation or a change thereof in a short time, and thus the excitation level lowers again.

To improve the foregoing situation, attention has been paid to the following five points of behavior or function of the human body.

Inclining and rocking of the upper part: 1. The inclining and rocking of the semicircular canals resulting from the inclining and rocking of the head enhance the excitation of the sympathetic nervous system.

2. The inclining and rocking give a stimulus for the blood pressure sense organ, thereby controlling the excitation level of the sympathetic nervous system.

3. A momentary change in the working direction of gravity acting on the head capsule urges awakening through a sensibility change.

Inclining and rocking of the limbs:

4. Keeping the whole body virtually horizontal by lifting up the feet improves the stagnation of blood and other liquid in the body caused by gravity, and the momentary action of gravity on the body in varying directions promotes the return of blood.

Inclining and rocking of the whole body:

5. A momentary change in the working direction of gravity changes the working direction of force in the contact area between the body surface and the seat, thus recovering the sensibility of the skin in terms of stimulation kept dull by depressing for a long time, raising the excitation level of the sympathetic nervous system, and improving the flow of blood in the peripheral venous vessel close to the body surface.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a graph showing the effects of the embodiment of the present invention.

DETAILED DESCRIPTION

To accomplish the object, a seat discomfort preventive device according to the present invention comprises: a seat back capable of inclining in the fore-and-aft direction; a seat cushion capable of inclining in the fore-and-aft direction; rocking(or inclining and rocking) control means for delivering, in response to a start signal and/or upon control of console means, a control signal in accordance with which at least one of the seat back and the seat cushion is rocked(or inclined and rocked) with respect to a standard position and this rocking motion is repeated; and drive means for rocking(or inclining and rocking) at least one of the seat back and the seat cushion on the basis of the control signal from the rocking(or inclining and rocking) control means.

In the seat discomfort preventive device of the present invention, in response to the operation of the inclining and rocking control means resulting from control of the console means, the drive means may incline at least one of the seat back and the seat cushion rearward to lift up the feet or lift down the upper part to make the whole body virtually horizontal, whereby the stagnation of blood and other liquid in the body caused by gravity can be improved.

At least one of the seat back and the seat cushion may be rocked after being inclined to make gravity act momentarily on the body in varying directions, whereby the return of blood can be enhanced.

The rocking of the seat back can excite the sympathetic nervous system through the rocking of the semicircular canals, raise the excitation level of the sympathetic nervous system through the blood pressure sense organ, and urge awakening because sensibility is recovered as the working direction of gravity acting on the head capsule varies momentarily.

The rocking of at least one of the seat back and the seat cushion momentarily changes the working direction of gravity to change the working direction of force in the contact area between the body surface and the seat, whereby the sensibility of the skin in terms of stimulation kept dull by depressing for a long time can be recovered; the excitation level of the sympathetic nervous system can be raised; and the blood flow in the peripheral venous vessel can be improved.

In the present invention, as will be appreciated, the seat back and the seat cushion may be inclined and rocked integrally about one pivot point or independently about separate pivot points.

An embodiment of the present invention will now be described.

Figure 1:
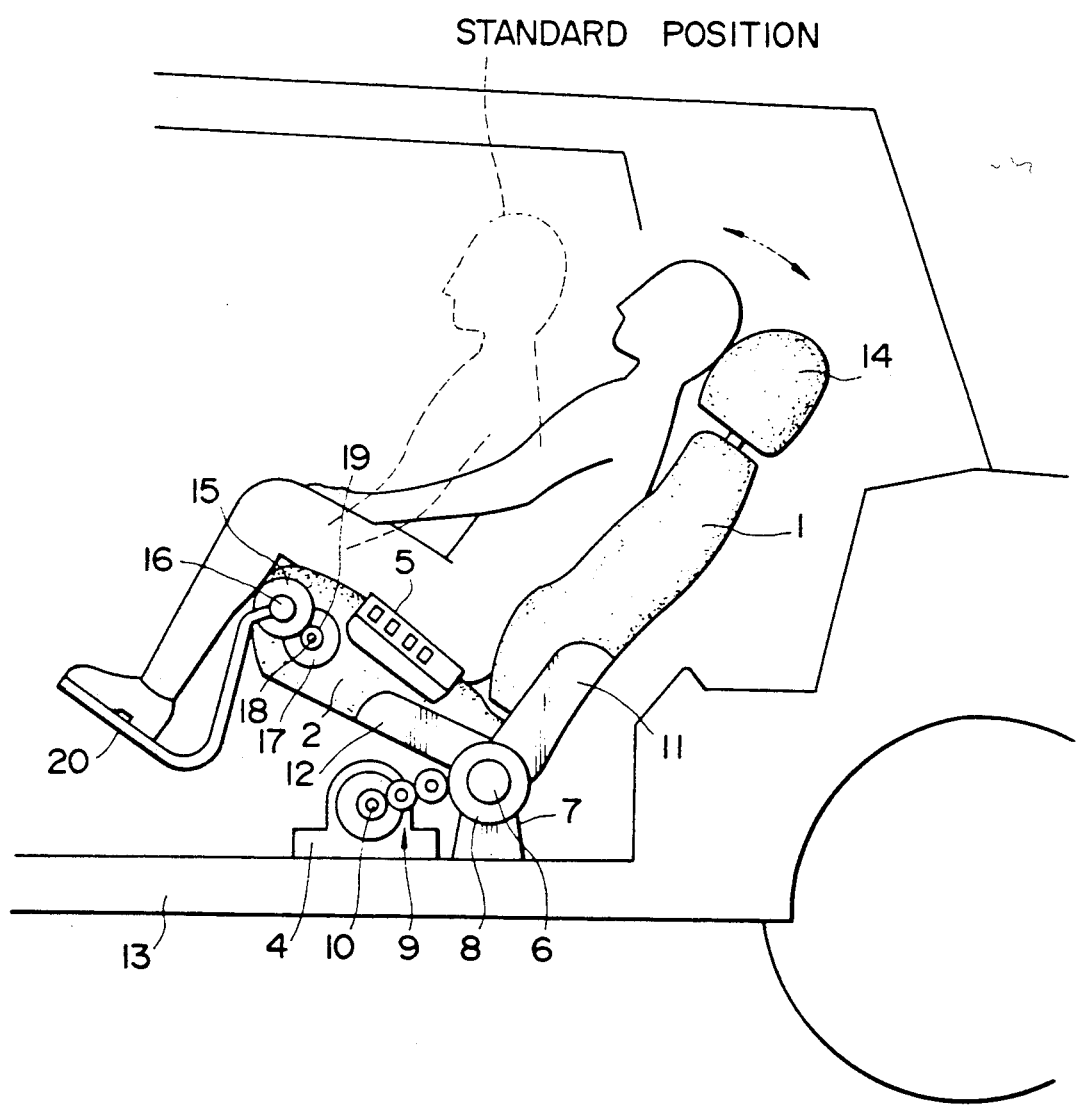
FIG. 1 is a schematic diagram of an embodiment of the present invention.
Figure 2:
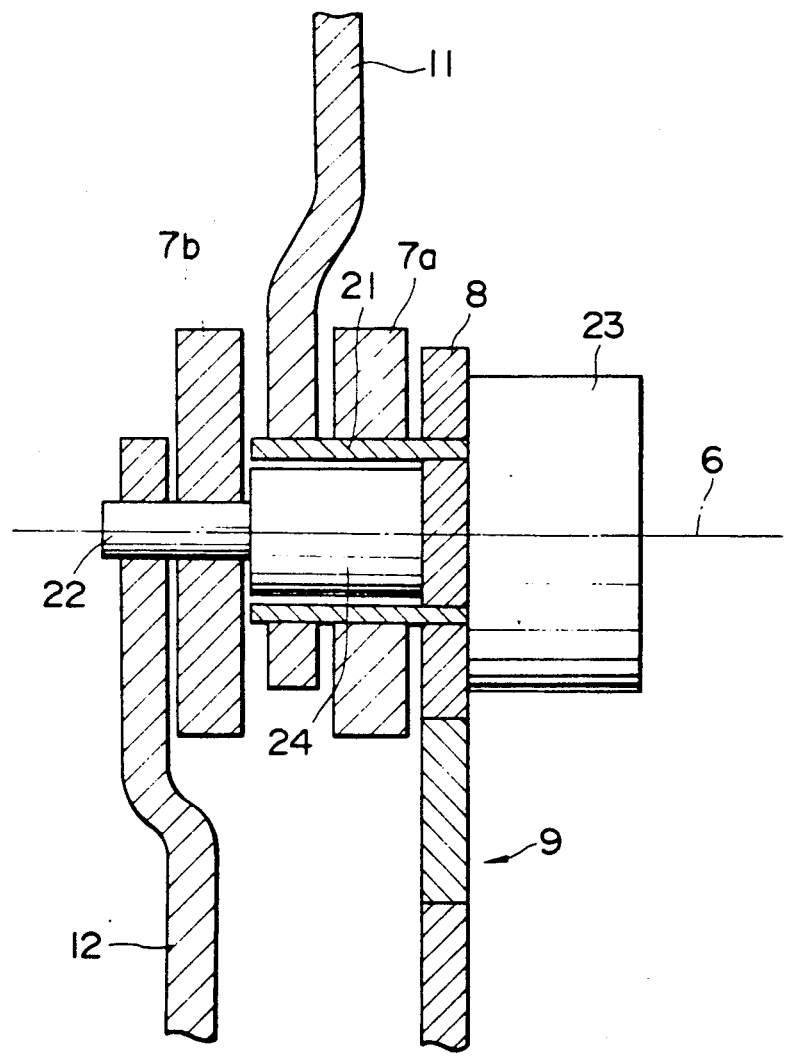
FIG. 2 is a block diagram of a control system of the embodiment of the present invention.

As shown in FIG. 1, a seat discomfort preventive device according to the embodiment comprises: a seat back 1 for supporting the upper part of a passenger; a stay 11 for supporting the seat back 1 rotatably about a first shaft 6; a seat cushion 2 for supporting the buttocks and thighs of the passenger; a stay 12 for supporting the seat cushion 2 rotatably about the first shaft 6; a drive gear 8 for turning the stays 11 and 12 and via drive shafts 21 and 22 shown in FIG. 2 the seat back 1 and the seat cushion 2; a first motor 4 with an output shaft 10 for driving via a gear train 9 the drive gear 8; a mount base 7 for supporting the first shaft 6 and the drive shafts 21 and 22 rotatably on a chassis 13; a foot plate 20 attached to the seat cushion 2 for supporting the feet of the passenger; a second shaft 16 for rotatably connecting the foot plate 20 to the seat cushion 2; a second motor 17 with an output shaft 18 for turning via an output gear 19 and a drive gear 15 the foot plate 20; a head rest 14 secured to the seat back 1 for supporting the head; a switch block 5 acting as console means for selection of the start, end, operation modes, etc. of turning action of each of the seat back 1, seat cushion 2, and foot plate 20; and inclining and rocking control means 3 (shown in FIG. 3) for controlling the rotation of the first and second motors 4 and 17 in accordance with an input signal from the switch block 5. As shown in FIG. 2, the stays 11 and 12 are secured to the drive shafts 21 and 22, respectively, and the drive shafts 21 and 22 are rotatably supported by mount base segments 7a and 7b, respectively. The drive shafts 21 and 22 are connected to and disconnected from the drive gear 8 by electromagnetic dog clutches 23 and 24 controlled by the inclining and rocking control means 3 shown in FIG. 3.

Figure 4:
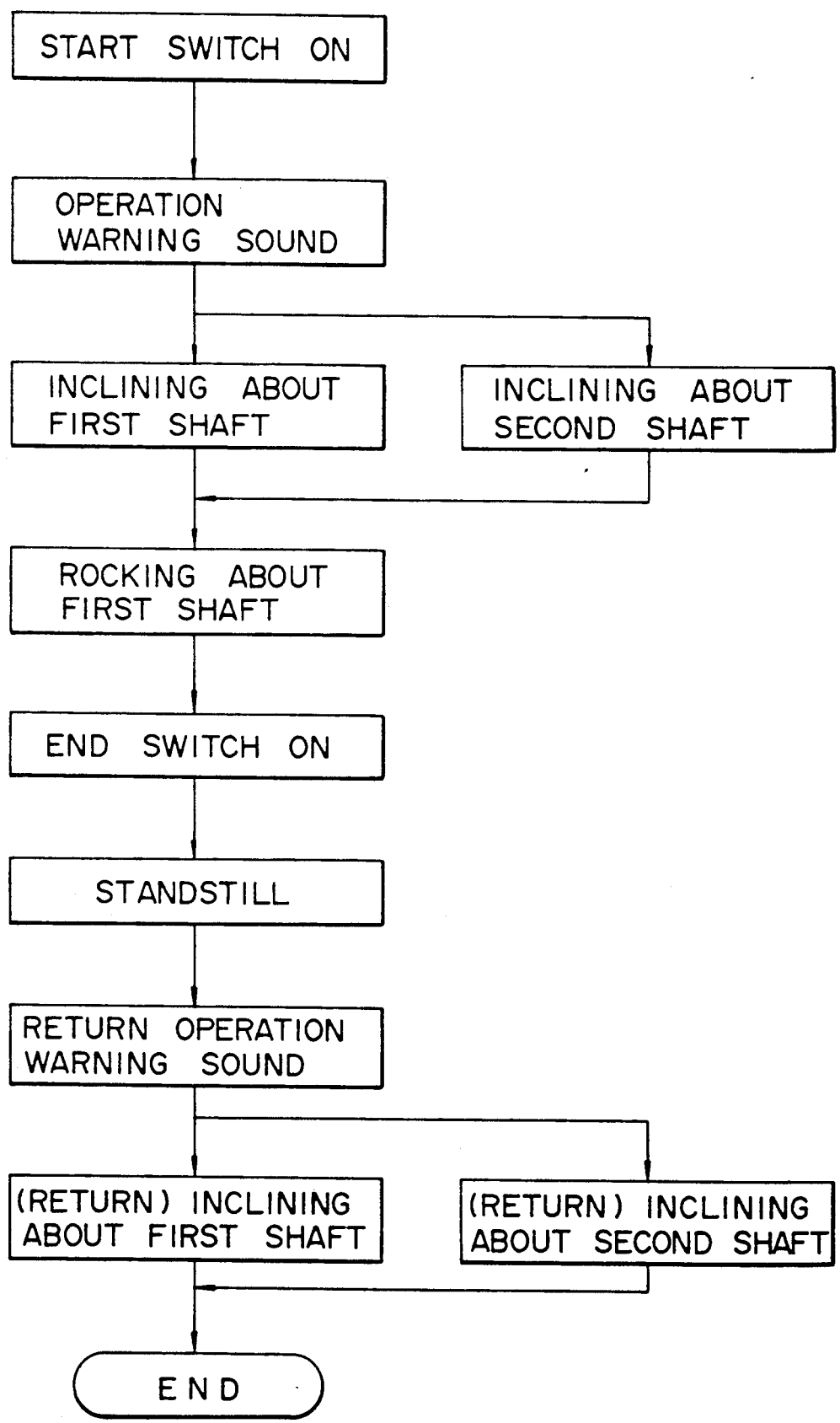

The operation of the seat discomfort preventive device according to the embodiment is as follows. As shown in FIG. 4, when a start signal is applied to the inclining and rocking control means 3 by depressing a start switch, an operation warning sound is generated. After the stays 11 and 12 are connected to the drive gear 8 by the electromagnetic dog clutches 23 and 24 in accordance with a control signal from the inclining and rocking control means 3, the first motor 4 shown in FIG. 1 rotates the output shaft 10, gear train 9, and drive gear 8 to incline the seat back 1, seat cushion 2, and foot plate 20 attached to the seat cushion 2 about the first shaft 6 rearwardly of the passenger. This corresponds to stage 1 shown in FIG. 5.

The position of a combination of the seat back 1, seat cushion 2, and foot plate 20 relative to the chassis 13 before inclining is referred to as a standard position (illustrated by the broken line representative of the body in FIG. 1). The angle of inclination thus attained is preferably within a range of about 5 degrees to 30 degrees, but may be modified as desired.

As will be appreciated from FIG. 5, the stagnation of the blood flow in the shanks is remarkably improved by the inclining of stage 1. However, the blood flow tends to stagnate after the inclining is completed and stopped.

Upon completion of the inclining, the first motor 4 repeatedly undergoes forward rotation, stop, and reverse rotation in accordance with a control signal from the inclining and rocking control means 3 to rock (via the output shaft 10, gear train 9, and drive gear 8) the seat back 1, seat cushion 2, and foot plate 20 attached to the seat cushion 2, about the first shaft 6 in the fore-and-aft direction from the inclined position.

Since the blood is a viscous fluid and the blood vessel and the body organization have elasticity and viscosity, a certain time is needed between when the blood flow is virtually generated by one rocking and when it becomes complete. Further, since the sensibility of the body involves adaptability, the influence of the stimulation of one rocking on the sense organ and the nervous system becomes dull in a short time.

Although the blood flow is caused by one rocking, the body adapts to circumstances such as the working direction of gravity, the position of the semicircular canals and the like, which causes the stagnation of the blood flow again.

To remove the bad influence of adaptability of the body on the blood flow, the turning direction of the components must be reversed at each time of arising of the adaptability. That is, rocking motion corresponding to a series of turning motion gives adequate stimulation to the body to activate the blood flow.

In view of the adaptability of the body as above, it is preferable that the amplitude angle on each side of the rocking be between 1 degree and 10 degrees, the period between 10 seconds and 40 seconds, and the angular velocity between 0.35 degrees per sec and 1.5 degrees per sec. Further, from considering some delay in the blood flow, it is advantageous to temporarily stop the rocking for about 4 seconds to 12 seconds at the position where the gradient of rocking becomes maximum. Of course, the amplitude angle, period, angular velocity, and time interval of temporary stop may be modified as desired.

In stage 2 of FIG. 5, the amplitude angle of rocking is small and the period is short, thus gradually improving the stagnation of the blood flow in the shanks. However, the rate of improvement decreases gradually or the situation will become worse conversely. In such a case, the amplitude angle is increased and the period is elongated as in stage 3, thus gradually improving the stagnation of the blood flow.

When the passenger realizes a decreasing sense of discomfort and a definite sense of refreshness as the result of rocking, an end switch is depressed to apply an end signal to the inclining and rocking control means 3. Consequently, the rocking motion is stopped; a return operation warning sound is generated; the first motor 4 shown in FIG. 1 is energized in accordance with a control signal from the inclining and rocking control means 3 to turn (via the output shaft 10, gear train 9, and drive gear 8) the seat back 1, seat cushion 2, and foot plate 20 attached to the seat cushion 2 about the first shaft 6 frontwardly of the passenger; and thus, the standard position before inclining is restored.

Figure 3:
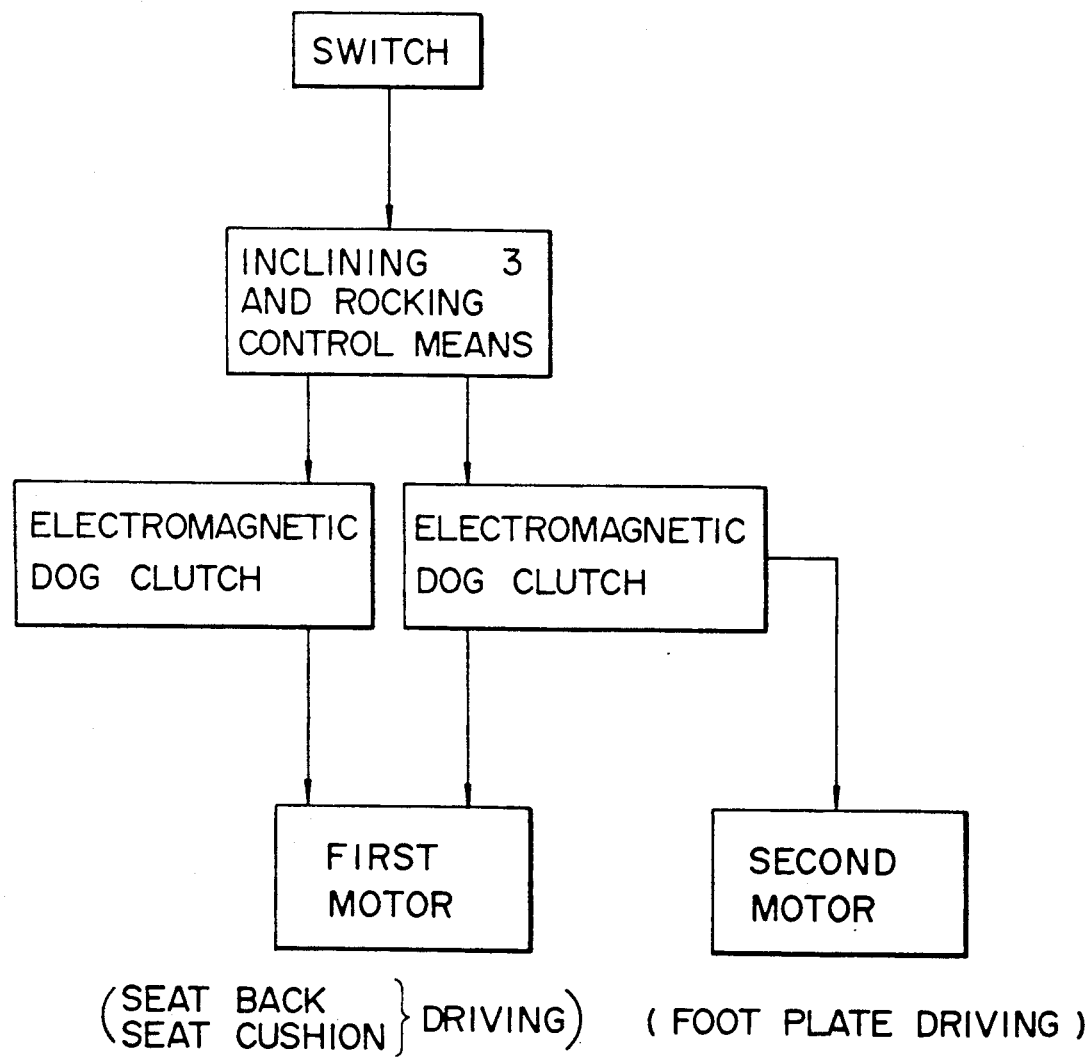
FIGS. 3 and 4 are flowcharts showing the operation of the embodiment of the present invention.

In the embodiment, the shanks are inclined and rocked by means of the foot plate 20, thus effectively improving the stagnation of the blood flow. The foot plate 20 may be turned upward about the second shaft 16. In this case, as shown in FIGS. 3 and 4, a control signal is provided from the inclining and rocking control means 3 in response to a turn-foot-plate signal from the switch block 5, so that the second motor turns the foot plate 20 via the output shaft 18, output gear 19, and drive gear 15.

The turning of the foot plate activates the blood flow in the shanks of the passenger. If the seat back 1, seat cushion 2, and foot plate 20 attached to the seat cushion 2 are rocked about the first shaft 6 additionally, the blood flow activated by the turning of the foot plate remains activated for a long time.

The order and combination of turning and inclining operations of the embodiment may be modified as desired, or the seat may be stopped and kept stationary in the course of any stage.

Further, several operation modes may be previously set in the inclining and rocking control means 3 so that the passenger can select any operation mode of inclining and rocking as desired.

The operation mode may be set as follows. At least one of the seat back, seat cushion, and foot plate to be inclined is selected; at least one of them to be rocked is selected; and the angle and period of inclining/rocking are selected. To make the whole body comfortable, for example, the operation mode will be set such that the seat back, seat cushion, and foot plate are all subjected to inclining and rocking with the angle increased and the period elongated. To make only the shanks comfortable, the operation mode will be set such that only the foot plate is subjected to inclining and rocking with the angle decreased and the period shortened.

Although the center of inclining/rocking of the seat back and the seat cushion in the embodiment is located close to the joint between the seat back and the seat cushion, it may be located at any point in the rear of the seat, for example, at the rear upper end or rear center of the seat back, or at the lower center of the seat cushion.

Further, the center of inclining/rocking may be located at any point in front of the seat, for example, at the front upper end or front center of the seat back, or at the upper center of the seat cushion. The number of such centers may be two or more. Although rocking takes place after inclining in the embodiment, inclining may be performed after rocking, or both operations may be performed simultaneously.

What is claimed is:

1. A seat discomfort preventive device comprising a seat back capable of inclining and rocking in the fore-and-aft direction,
a seat cushion capable of inclining and rocking in the fore-and-aft direction independently of said seat back,
console means for delivering signals designating inclining and rocking conditions depending on the choice of a user,
inclining and rocking control means connected to the console means, for delivering control signals in response to the signals from the console means, and
first drive means for inclining at least one of the seat back and the seat cushion from a standard position and thereafter rocking the same repeatedly based on a sense of fatigue or stagnation of blood, in response to the control signals from the inclining and rocking control means.

2. A seat discomfort preventive device according to claim 1, wherein the angle of inclination of the seat back and of the seat cushion from the standard position is within a range of 5 degrees to 30 degrees.

3. A seat discomfort preventive device according to claim 1, wherein half of the amplitude of rocking the seat back and the seat cushion from an inclined position thereof as a fulcrum is from 1 degree to 10 degrees, the period is from 10 seconds to 40 seconds, and the angular velocity is from 0.35 degrees per sec to 1.5 degrees per sec.

4. A seat discomfort preventive device according to claim 1, further comprising a foot plate rockably attached to the seat cushion, and second drive means for rocking the foot plate.

5. A seat discomfort preventive device comprising
a seat back capable of rocking in the fore-and-aft direction,
a seat cushion capable of rocking in the fore-and-aft direction independently of said seat back
console means for delivering signals designating rocking conditions depending on the choice of a user,
rocking control means connected to the console means, for delivering control signals in response to the signals from the console means, and
first drive means for rocking at least one of the seat back and the seat cushion in response to the control signals from the rocking control means, wherein
the first drive means comprises first and second drive shafts for driving the seat back and the seat cushion independently of each other,
a drive gear driven by a motor for turning via a drive transmit mechanism the first and second drive shafts on the basis of the control signal from the rocking control means,
two electromagnetic clutches for connecting and disconnecting the drive gear and the first and second drive shafts, and
a mount base for rotatably supporting the drive shafts on a chassis.

6. A seat discomfort preventive device according to claim 8, further comprising
a foot plate rotatably supported by the seat cushion on which the feet of a passenger are rested,
a drive gear for turning the foot plate, and
a motor for turning via a drive transmit mechanism the drive gear.

* * * * *